US012617720B2

(12) United States Patent (10) Patent No.: US 12,617,720 B2
Chen et al. (45) Date of Patent: May 5, 2026

(54) BASALT FIBER REINFORCED CONCRETE

(71) Applicants: National Central University, Taoyuan
City (TW); UAN TAN CO., LTD.,
Taoyuan City (TW)

(72) Inventors: Jieh-Haur Chen, Taoyuan City (TW);
Yu-Min Su, Taoyuan City (TW);
Min-Chih Liao, Taoyuan City (TW);
Yen-Yu Lin, Taoyuan City (TW);
Cheng-Ching Peng, Taoyuan City
(TW)

(73) Assignees: National Central University, Taoyuan
City (TW); UAN TAN CO., LTD.,
Taoyuan City (TW)

( * ) Notice: Subject to any disclaimer, the term of this
patent is extended or adjusted under 35
U.S.C. 154(b) by 329 days.

(21) Appl. No.: 18/377,375

(22) Filed: Oct. 6, 2023

(65) Prior Publication Data

US 2025/0034042 A1 Jan. 30, 2025

(30) Foreign Application Priority Data

Jul. 27, 2023 (TW) ................................ 112128241

(51) Int. Cl.
*C04B 14/46* (2006.01)
*C04B 28/04* (2006.01)
*E04B 1/04* (2006.01)

(52) U.S. Cl.
CPC .......... *C04B 14/4631* (2013.01); *C04B 28/04*
(2013.01); *C04B 2201/50* (2013.01); *E04B*
*1/04* (2013.01)

(58) Field of Classification Search
CPC . C04B 14/4631; C04B 28/04; C04B 2201/50;
C04B 28/02; E04B 1/04
See application file for complete search history.

(56) References Cited

FOREIGN PATENT DOCUMENTS

| CN | 105541208 A | * | 5/2016 | ......... | C04B 20/1066 |
| CN | 106830846 A | * | 6/2017 | ............ | C04B 28/04 |
| CN | 107200516 A | * | 9/2017 | .......... | C04B 20/023 |
| CN | 111470820 A | * | 7/2020 | ............ | C04B 14/46 |
| CN | 116102307 A | * | 5/2023 | ............ | C04B 28/04 |

* cited by examiner

*Primary Examiner* — Anthony J Green
(74) *Attorney, Agent, or Firm* — Demian K. Jackson;
Jackson IPG PLLC

(57) ABSTRACT

The present invention relates to a basalt fiber reinforced
concrete, which includes: a cement slurry with a water-to-
cement ratio between 0.3 and 0.5, and a slurry volume
percentage between 15-25%; an aggregate with an aggregate
volume percentage between 65% and 75%; a basalt fiber
reinforcement with a fiber volume percentage between 0.2%
and 1.00%; and a concrete admixture used to adjust the
properties of the basalt fiber reinforced concrete.

8 Claims, 4 Drawing Sheets

FIG. 1

BASALT FIBER REINFORCED CONCRETE

CROSS-REFERENCE TO RELATED APPLICATION

This application claims priority benefit to Taiwan Invention patent application No. 112128241, filed on Jul. 27, 2023, in Taiwan Intellectual Property Office, the entire disclosures of which are incorporated by reference herein.

FIELD

The present invention relates to a basalt fiber reinforced concrete, in particular to a basalt fiber reinforced concrete with enhanced toughness and fracture energy by adding basalt fiber reinforcements to normal-weight concrete.

BACKGROUND

In the state of the art, solidified concrete can exhibit excellent compressive strength but lacks toughness due to its inherent natural properties. It means that the concrete can bear considerable weight without collapsing, while it has an inherent weakness against tensile and bending moments. Even with the addition of reinforced steel to strengthen the structure, known as reinforced concrete (RC), there is not much improvement. Given the nature of concrete, traditional concrete mix design methods tend to follow this natural characteristic, and the primary performance design is for compressive strength, while tensile and flexural strength, which represent toughness, are secondary considerations.

In the field of civil engineering, concrete with high toughness is generally classified as high performance concrete (HPC) or ultra-high performance concrete (UHPC), which belong to the emerging category of construction materials in the field of civil engineering in recent years. In fact, high-toughness concrete has significant application value, including the ability to significantly improve the seismic resistance, crack resistance, and durability of structures, extend the service life of structures, and increase the operational efficiency and economic value, among other benefits.

Based upon an international scale, high-toughness concrete has been widely applied in basic infrastructure projects such as transportation and water conservancy, including bridge engineering, dam engineering, tunnel engineering, elevated bridge engineering, high-speed railway engineering, retaining wall engineering, and so on.

For instance, the most recent research and management team under the Pavement Added Structures (TOPS) project at the Federal Highway Administration (FHWA) in the United States has specifically begun to incorporate toughness design of civil materials into road design requirements, which covers integrating resilience design concepts into cement concrete material road designs, allowing the use of cement concrete material as an additional rigid pavement layer on existing rigid or flexible road surfaces. Further detailed considerations involve determining whether the two layers are bonded together in the resilience design.

Especially in recent years, global warming has led to the frequent occurrence of extreme temperatures, heavy rains, and seismic events, causing significant impacts and damage to various foundation infrastructures. This has led to a high demand for the toughness performance of concrete in various engineering designs, including infrastructure projects. With this in mind, the development of high-toughness concrete has become an urgent issue.

In view of the deficiencies/issues in the state of the art, there is a need to solve the above deficiencies/issues. Hence, the inventor has come up with the present invention of "Basalt Fiber Reinforced Concrete" after painstaking trials, research and perseverance to overcome the aforementioned deficiencies. The brief description of the present invention is disclosed as follows.

SUMMARY

The present invention relates to a basalt fiber reinforced concrete, in particular to a basalt fiber reinforced concrete with enhanced toughness and fracture energy by adding basalt fiber reinforcements to normal-weight concrete.

The present invention provides a basalt fiber reinforced concrete. The basalt fiber reinforced concrete includes a cement slurry with a water-to-cement ratio between 0.3 and 0.5, and a slurry volume percentage between 15-25%; an aggregate with an aggregate volume percentage between 65% and 75%; a basalt fiber reinforcement with a fiber volume percentage between 0.2% and 1.00%; and a concrete admixture used to adjust the properties of the basalt fiber reinforced concrete.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIG. 1 is a graph illustrating the relationship between compressive strength and curing days for concrete containing basalt fibers according to the present invention;

DETAILED DESCRIPTION

Figure 2:
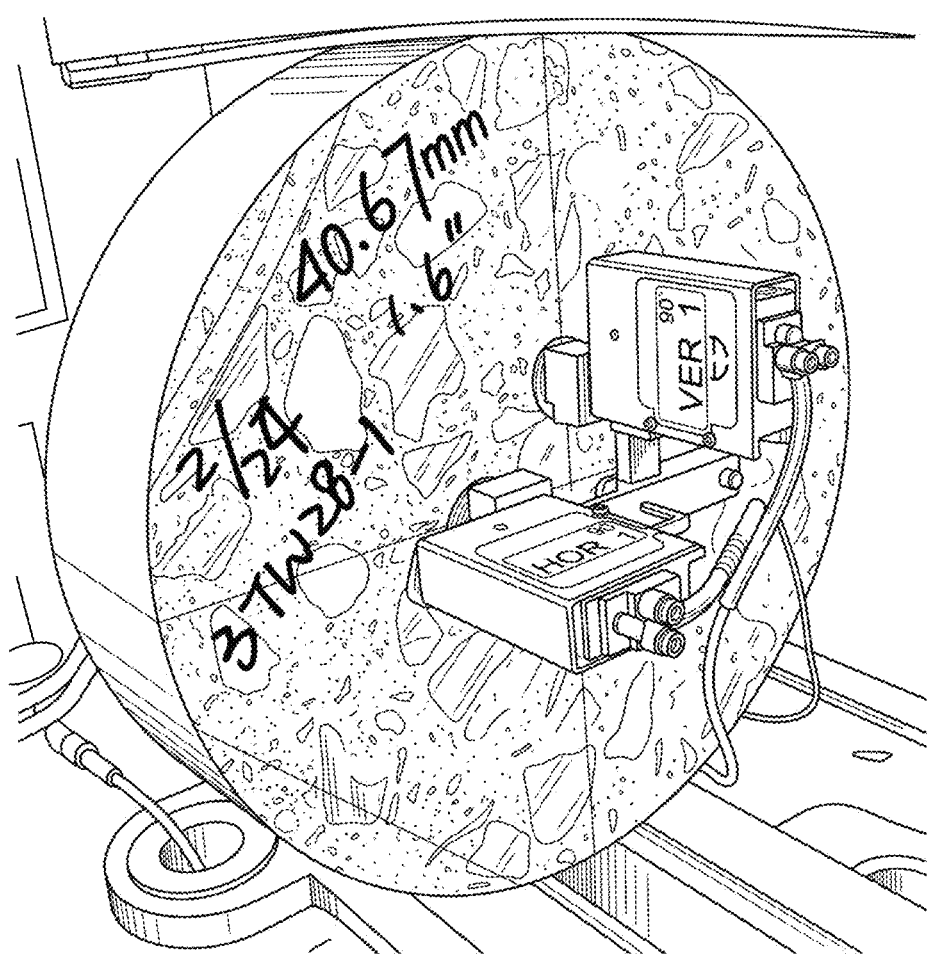
FIG. 2 and FIG. 3 are actual images demonstrating the actual test configurations for the disc splitting test used to test basalt fiber reinforced concrete according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including" used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The development of high-resilience concrete has become an important issue. The present invention provides adding basalt fiber reinforcement bars into the cement slurry as a reinforcing material to form basalt fiber reinforced concrete after solidification, so as to enhance the engineering mechanics performance and toughness properties thereof, and also discloses the suggested amount of basalt fiber reinforcement bars added as well as the toughness design performance of the asphalt concrete pavement structure after adding the basalt fiber reinforcement bars, wherein the strength performance of toughness is evaluated by conducting a disc splitting test to evaluate fracture energy.

The present invention provides a type of basalt fiber reinforcement bars, primarily consisting of basalt fiber, which is a new type of composite material that is produced by first combining and mixing with polymer materials such as, but not limited to, synthetic resins, unsaturated polyesters, epoxy resins, or vinyl resins, along with fillers and curing agents and then performing an extrusion molding process.

Measurements indicate that the basalt fiber reinforcement bars provided in the present invention include physical properties as follows. The density of the basalt fiber reinforcement bars is in a range between 1.9 to 2.1 $g/cm^3$, which is only about ¼ of that of steel bars (given that the density of steel bars is 7.8 to 7.9). The tensile strength of the basalt fiber reinforcement bars is approximately 2 to 3 times that of steel bars. The thermal expansion coefficient of the basalt fiber reinforcement bars is very close to that of concrete, which ensures that the deformation between the basalt fiber reinforcement bars and the concrete is synchronous.

The basalt fiber reinforcement bars disclosed in the present invention are composite materials made of non-metallic materials, rendering them corrosion-resistant and electrically insulating, further with non-magnetic properties. The basalt fiber reinforcement bars also exhibit extremely high acid and alkali resistance, and have higher tolerance for moisture concentration and permeation and diffusion of carbon dioxide in cement slurry, preventing corrosion in harsh environments, thereby enhancing the durability for buildings built by using the basalt fiber reinforcement bars.

Embodiment 1

(A) Formulation of composition materials:

(1) Cement: It is preferable to use ASTM C150 Type I/II Portland cement, as Type I and Type II Portland cements are widely used in concrete engineering for general construction and building.

(2) Coarse and fine aggregate: It is preferable to use ⅜ inch stone, ¾ inch stone, and fine sand as coarse and fine aggregate skeleton.

(3) Basalt fibers: It is preferable to use basalt fibers with lengths in a range from 3 to 14 mm as reinforcement material, which can also replace a part of fine aggregate. The basalt fibers used in the present invention are produced by melting basalt rock at high temperatures, followed by centrifugal spinning, cooling, and sizing, and have an average thickness about 13 µm and appear as brown fibrous strands. Additionally, 6 mm basalt fibers are mixed in as additional additives. Basalt's main component is 50% (wt %) silicon dioxide, which improves the high-temperature performance and fatigue resistance of asphalt concrete. It is also mixed with aluminum oxide, iron (III) oxide, iron oxide, calcium oxide, magnesium oxide, etc., to have good mechanical properties and chemical stability.

The basalt fibers used in the present invention have the composition as shown in the following table:

| Composition | Percentage by weight |
|---|---|
| $SiO_2$ | 50% |
| $Al_2O_3$ | 15% |
| $Fe_2O_3$ | 10% |
| FeO | 10% |
| CaO | 8% |
| MgO | 7% |
| $Na_2O$ | 2.5~6% |
| $K_2O$ | 1% |
| Others | 2~3.5% |

The basalt fibers used in the present invention have the physical properties as shown in the following table:

| Physical properties | |
|---|---|
| Tensile strength | 2500~3500 MPA |
| Modulus of elasticity | 90~110 GPA |
| Elongation rate | ≤3.2% |
| Water content | ≤0.1% |
| Melting point | 1600° C. |

(4) Chemical admixtures: It is preferable to use air-entraining admixtures in compliance with ASTM C260 requirements, and to use water-reducing, retarding admixtures as plasticizers to meet ASTM C494 Type G requirements.

Chemical admixtures for concrete refer to chemical agents added before or during the concrete mixing, in addition to cement slurry, aggregates, and basalt fiber reinforcement bars, are used to adjust and alter the properties of freshly mixed concrete or solidified concrete, including workability, setting time, and solidification characteristics. The main purpose of adding a small amount of chemical admixtures is only to improve mixing efficiency and workability. It is generally believed that adding chemical admixtures cannot enhance the toughness for concrete.

(B) Proportioning of cement slurry, mixing, specimen production, and toughness design performance evaluation:

(1) Cement slurry: It is preferable to have a water-to-cement ratio (w/c) in a range between 0.15 and 0.75.

(2) Proportioning of cement slurry: It is preferable to design for "low-slurry-volume" normal-weight concrete, with the water-to-cement ratio controlled at around 0.5. Different proportions of ⅜ inch stone, ¾ inch stone, and fine sand are mixed, along with air-entraining and plasticizing admixtures to enhance workability. The proportioning of the "low-slurry-volume" cement slurry is in reference to the Rigid Pavement Proportioning Design Guide approved by the U.S. Department of Transportation, with the goal of minimizing the use of cement as few as possible while maximizing the interlocking ability of the aggregate. The "high-slurry-volume" proportioning follows the cement/aggregate ratio commonly used in Taiwan.

(3) Basalt fiber reinforcement bars in volume percentages of 0, 0.5, 1.0, and 1.5%, respectively, are added to replace a part of fine aggregate.

(4) After mixing, the cement slurry is then layered and poured into 100 mm (4 inches) and 150 mm (6 inches) diameter specimen molds and vibrated using a vibration table to produce solidified concrete specimens.

(C) The properties of freshly mixed concrete including slump, unit weight, air content, and temperature of freshly mixed concrete are listed as follows. For "low-slurry-volume" proportions, regardless of the amount of fiber added, the degree of slump is nearly zero. For "high-slurry-volume" proportions, slumps are generally distributed between 0-10 cm. The respective unit weights are distributed around 2,400 kgf/cm². The mixing temperature is not significantly increased in corresponding to the addition of basalt fibers.

Figure 1:
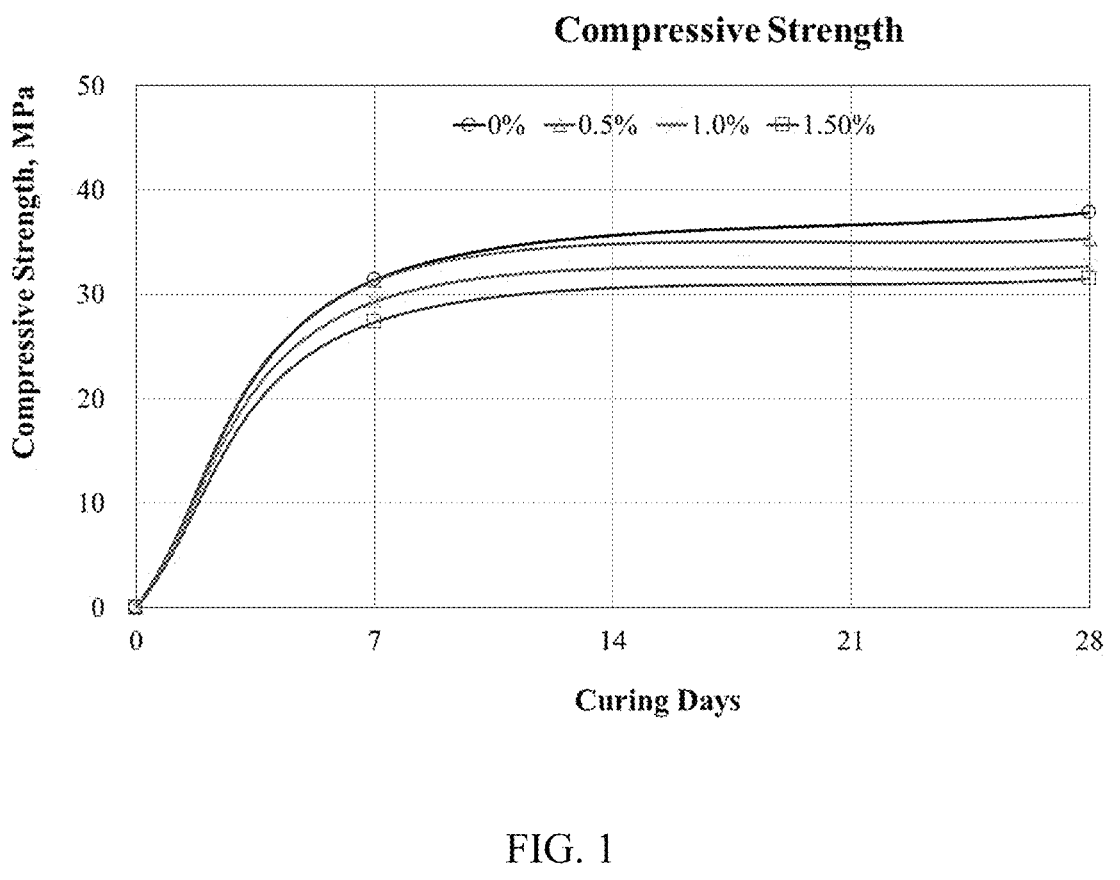

(1) Concrete curing time: FIG. 1 is a graph illustrating the relationship between compressive strength and curing days for concrete containing basalt fibers according to the present invention. After 24 hours of casting, the concrete is removed from the mold and then placed in the saturated lime water for curing/maintenance. After the hydration age, it is taken out to perform various relevant tests. The compressive strength of the solidified concrete with basalt fiber added is as shown in FIG. 1. The compressive strength of solidified basalt fiber concrete is distributed in 300-380 kgf/cm² (4,266-5,404 psi) at the hydration age of 28 days.

Embodiment 2

In this Embodiment, it is preferable to select basalt fiber reinforcement bars having lengths in a range of 12 mm to 14 mm, with ratios of 2 to 4 kilograms per cubic meter, to be added to cement slurry with water-to-cement ratios of 0.45 to 0.60, to form basalt fiber reinforced concrete structures after solidification. Measurements indicate that the reinforced concrete structures with the addition of basalt fiber reinforcement significantly increases bending strength by 9-14%, fracture energy by 126-140%, and resistance to abrasion by 2-18%. However, the compressive strength of a reinforced concrete structure is reduced by 8~18% when more than 0.5% basalt fibers are added.

Embodiment 3

In this Embodiment, it is preferable to select basalt fiber reinforcement bars in volume percentages of 0, 0.5, 1.0, 1.5, and 2.0%, respectively, to be added to a cement slurry with a water-to-cement ratio of 0.45. The mixing process involves the following steps of dry mixing coarse and fine aggregate for 1.5 minutes, adding Portland cement, and then continuing dry mixing for 1 more minute. Next, mix basalt fibers and chemical admixtures with water to form basalt fiber reinforced concrete structure after solidification. Measurements indicate that the basalt fiber reinforced concrete structure increases its splitting tensile strength by 14% with 2% fiber addition, its bending strength by 15-75% with 0.5-2% fiber addition, and its fracture energy by up to 220% with only 2% fiber addition, but its compressive strength decreases by about 3%.

Embodiment 4

In this Embodiment, it is preferable to select basalt fiber reinforcement bars in volume percentages of 0.10, 0.15, and 0.20%, respectively, to be added to a high-performance cement slurry with a water-to-cement ratio of 0.22 to form basalt fiber reinforced concrete structure after solidification. Measurements indicate that the basalt fiber reinforced concrete structure increases its mechanical properties including both bending and splitting tensile strength by 1.1-24.5% and 21.9-44.5% respectively with correspondingly higher amount of fiber addition, while its compressive strength remains unchanged.

Embodiment 5

In this Embodiment, it is preferable to select basalt fiber reinforcement bars having lengths in a range of 6 mm to 12 mm in volume percentages of 0, 0.1, 0.2, 0.3, 0.4, and 0.5%, respectively, to be added to a normal-weight concrete to form basalt fiber reinforced concrete structure after solidification.

Measurements indicate that the basalt fiber reinforced concrete structure with 0.3% basalt fiber addition at a length of 6 mm has its highest compressive strength, but its compressive strength decreases at a length of 12 mm with higher amount of basalt fiber addition due to uneven fiber mixing and dispersion. In the splitting test, the splitting strength shows a decreasing trend at the 0.5% fiber addition, but in the bending test, the highest values are obtained regardless of fiber length.

Figure 3:
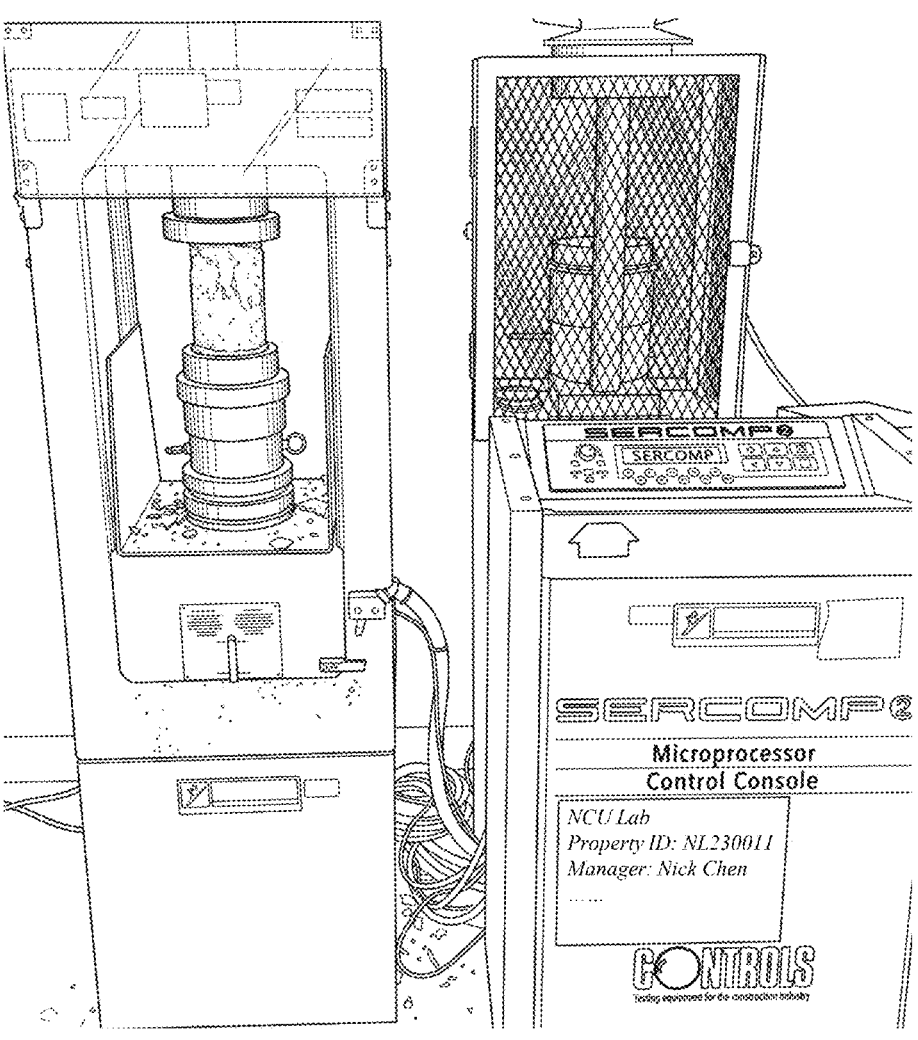

FIG. 2 and FIG. 3 are actual images demonstrating the actual test configurations for the disc splitting test used to test basalt fiber reinforced concrete according to the present invention. In the field of civil engineering materials, the disc splitting test, which is capable of demonstrating fracture energy, is commonly used to evaluate the toughness performance of civil engineering materials. Therefore, in the present invention, the disc splitting test is selected to evaluate fracture energy, lateral strain, and tensile strength for the basalt fiber reinforced concrete. In the disc splitting test, it is preferable to use basalt fiber reinforced concrete disc specimens having a diameter of 150 mm and a thickness of 38 mm. The test configuration is shown in FIG. 1 and FIG. 2. During performing the disc splitting test, measurements for lateral strain are conducted at the same time on the surface of the disc section, so to plot an indirect tension stress-strain curve to evaluate the fracture energy.

Figure 4:
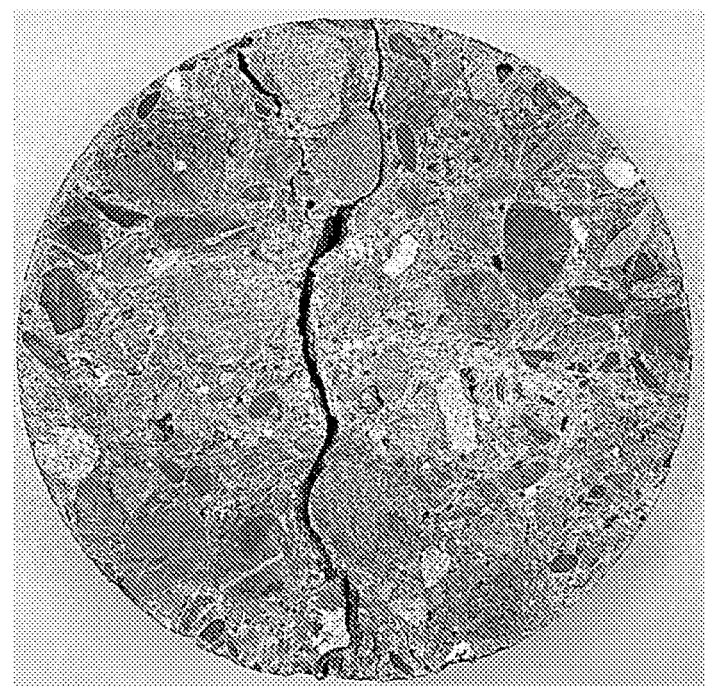
FIG. 4 is an actual image demonstrating the surface crack development of basalt fiber reinforced concrete with basalt fibers added according to the present invention.
Figure 5:
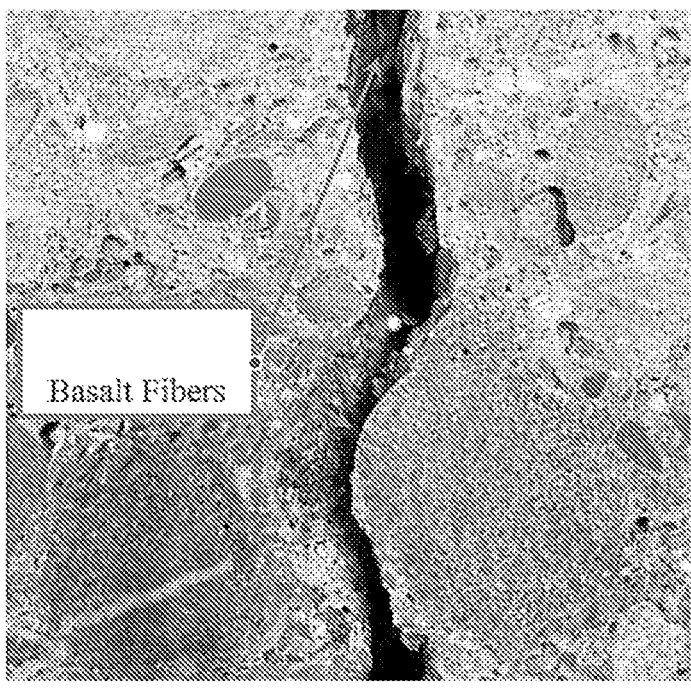
FIG. 5 is an actual image demonstrating the reinforcing capability within the surface cracks provided by basalt fibers according to the present invention.

FIG. 4 is an actual image demonstrating the surface crack development of basalt fiber reinforced concrete with basalt fibers added according to the present invention. FIG. 5 is an actual image demonstrating the reinforcing capability within the surface cracks provided by basalt fibers according to the present invention. The surface crack developments of the basalt fiber-reinforced concrete disc specimen after splitting are shown in FIG. 4 and FIG. 5, which show that the basalt fibers exhibit the excellent tensile strength, which improves the toughness of the disc specimen.

The present invention provides using corrosion-resistant basalt fiber reinforcements to add into concrete materials as a strengthening material, which can enhance the engineering mechanical properties and toughness design performance for the reinforced concrete structure. It can also further improve the performance of the reinforced concrete structure, especially in terms of crack resistance, seismic resistance, impact resistance, and durability.

The basalt fiber reinforced concrete material provided in the present invention can be applied to areas requiring impact resistance, such as bus lanes, expansion joints, sidewalks, heavy traffic areas, building floors, etc. It can also be applied for non-structural cement concrete products, including precast cement floor tiles, interlocking bricks, permeable bricks, curbstones, etc., to enhance their durability.

In the present invention, due to the addition of basalt fiber reinforcement, the basalt fiber reinforced concrete can provide restraint force, which can increase the structural load-bearing capacity, reduce crack width, improve the efficiency of both longitudinal and transverse stress transfer, and extend the overall life cycle of the building and structure added with basalt fibers.

There are further embodiments provided as follows.

Embodiment S1: A basalt fiber reinforced concrete includes a cement slurry with a water-to-cement ratio between 0.3 and 0.5, and a slurry volume percentage between 15-25%; an aggregate with an aggregate volume percentage between 65% and 75%; a basalt fiber reinforcement with a fiber volume percentage between 0.2% and 1.00%; and a concrete admixture used to adjust the properties of the basalt fiber reinforced concrete.

Embodiment S2: The basalt fiber reinforced concrete as described in Embodiment S1, the cement slurry further includes one of a Portland cement, a Type I Portland cement, a Type II Portland cement, a Type III Portland cement, a Type IV Portland cement, a Type V Portland cement, an air-entraining Portland cement, a Type I air-entraining Portland cement, a Type II air-entraining Portland cement, a Type III air-entraining Portland cement, a slag cement, a fly ash cement, a volcanic ash cement, a masonry cement, an expansive cement, a waterproof cement, an oil well cement, a white cement, a magnesia oxychloride cement, a Japanese cement, or a combination thereof.

Embodiment S3: The basalt fiber reinforced concrete as described in Embodiment S1, the water-to-cement ratio is 0.30, 0.32, 0.35, 0.38, 0.40, 0.42, 0.44, 0.45, 0.46, or 0.50.

Embodiment S4: The basalt fiber reinforced concrete as described in Embodiment S1, wherein the aggregate volume percentage is calculated according to the American Concrete Institute (ACI) proportioning design method.

Embodiment S5: The basalt fiber reinforced concrete as described in Embodiment S1, the fiber volume percentage is 0.2%, 0.3%, 0.4%, 0.5%, 0.6%, 0.7%, 0.8%, 0.9%, or 1.0%.

Embodiment S6: The basalt fiber reinforced concrete as described in Embodiment S1, the concrete admixture is one selected from a superplasticizer, an air-entraining agent, a water reducer, a rapid setting agent, a retarding agent, an early strength agent, a water-reducing retarding agent, a water-reducing early strength agent, a high-performance water reducer, a high-performance water-reducing retarding agent, a plasticizer, a plasticizing and retarding agent, a pigment, a corrosion inhibitor, a shrinkage reducer, a freeze-thaw resistant agent, a pumping aid, a flowability concrete admixture, a special purpose admixture, and a combination thereof.

Embodiment S7: The basalt fiber reinforced concrete as described in Embodiment S1, the basalt fiber reinforcement includes a basalt fiber, an unsaturated polyester, an epoxy, a vinyl resin, a filler, a curing agent, or combinations thereof.

Embodiment S8: The basalt fiber reinforced concrete as described in Embodiment S1, the basalt fiber reinforcement is produced by combining basalt fibers as the main material with polymer materials, and then performing an extrusion molding process.

Embodiment S9: The basalt fiber reinforced concrete as described in Embodiment S1, the basalt fiber reinforcement has a length in range between 3-14 mm.

Embodiment S10: The basalt fiber reinforced concrete as described in Embodiment S1, the basalt fiber reinforced concrete has a compressive strength greater than 250 kgf/cm$^2$ (3,500 psi) and a fracture energy density greater than 250 J/m$^3$.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A basalt fiber reinforced concrete, comprising:
   a cement slurry with a water-to-cement ratio between 0.3 and 0.5, and a slurry volume percentage between 15-25%;
   an aggregate with an aggregate volume percentage between 65% and 75%;
   a basalt fiber reinforcement with a fiber volume percentage between 0.2% and 1.00%; and
   a concrete admixture used to adjust the properties of the basalt fiber reinforced concrete.

2. The basalt fiber reinforced concrete according to claim 1, wherein the cement slurry further comprises one of a Portland cement, a Type I Portland cement, a Type II Portland cement, a Type III Portland cement, a Type IV Portland cement, a Type V Portland cement, an air-entraining Portland cement, a Type I air-entraining Portland cement, a Type II air-entraining Portland cement, a Type III air-entraining Portland cement, a slag cement, a fly ash cement, a volcanic ash cement, a masonry cement, an expansive cement, a waterproof cement, an oil well cement, a white cement, a magnesia oxychloride cement, a Japanese cement, or a combination thereof.

3. The basalt fiber reinforced concrete according to claim 1, wherein the water-to-cement ratio is 0.30, 0.32, 0.35, 0.38, 0.40, 0.42, 0.44, 0.45, 0.46, or 0.50.

4. The basalt fiber reinforced concrete according to claim 1, wherein the aggregate volume percentage is calculated according to the American Concrete Institute (ACI) proportioning design method.

5. The basalt fiber reinforced concrete according to claim 1, wherein the fiber volume percentage is 0.2%, 0.3%, 0.4%, 0.5%, 0.6%, 0.7%, 0.8%, 0.9%, or 1.0%.

6. The basalt fiber reinforced concrete according to claim 1, wherein the concrete admixture is one selected from a superplasticizer, an air-entraining agent, a water reducer, a rapid setting agent, a retarding agent, an early strength agent, a water-reducing retarding agent, a water-reducing early strength agent, a high-performance water reducer, a high-performance water-reducing retarding agent, a plasticizer, a plasticizing and retarding agent, a pigment, a corrosion inhibitor, a shrinkage reducer, a freeze-thaw resistant agent, a pumping aid, a flowability concrete admixture, a special purpose admixture, and a combination thereof.

7. The basalt fiber reinforced concrete according to claim 1, wherein the basalt fiber reinforcement has a length in range between 3-14 mm.

8. The basalt fiber reinforced concrete according to claim 1, wherein the basalt fiber reinforced concrete has a compressive strength greater than 250 kgf/cm$^2$ (3,500 psi) and a fracture energy density greater than 250 J/m$^3$.

* * * * *